US012637202B2

(12) United States Patent
   Ghattas

(10) Patent No.: US 12,637,202 B2
(45) Date of Patent: May 26, 2026

(54) DISENGAGEMENT FOR REVERSE PROPELLER PROTECTION

(71) Applicant: Pratt & Whitney Canada Corp., Québec (CA)

(72) Inventor: Andrew Ghattas, Québec (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 189 days.

(21) Appl. No.: 18/535,300

(22) Filed: Dec. 11, 2023

(65) Prior Publication Data

US 2025/0187719 A1      Jun. 12, 2025

(51) Int. Cl.
   *B64C 11/30*       (2006.01)
   *B64C 11/34*       (2006.01)
   *B64D 31/06*       (2024.01)
   *B64D 45/00*       (2006.01)

(52) U.S. Cl.
   CPC ............ *B64C 11/308* (2013.01); *B64C 11/34* (2013.01); *B64D 31/06* (2013.01); *B64D 45/00* (2013.01)

(58) Field of Classification Search
   CPC ..... B64C 11/308; B64C 11/34; B64C 11/301; B64C 11/305; B64D 31/06; B64D 45/00; F02C 9/58
   See application file for complete search history.

(56) References Cited

U.S. PATENT DOCUMENTS

| | | | |
|---|---|---|---|
| 8,613,185 | B2 | 12/2013 | Dupre |
| 11,414,175 | B2 | 8/2022 | Zingaro et al. |
| 11,738,855 | B2 | 8/2023 | Forte et al. |
| 2021/0009278 | A1 | 1/2021 | Forte et al. |

FOREIGN PATENT DOCUMENTS

| | | | | |
|---|---|---|---|---|
| CA | 3068173 | A1 | 7/2020 | |
| CA | 3077511 | A1 * | 10/2020 | ............. B64D 31/00 |
| CN | 111936384 | A | 11/2020 | |
| CN | 114945510 | A * | 8/2022 | ............. B64C 37/00 |

OTHER PUBLICATIONS

Machine Translation of CN 114945510 A downloaded from IP.com (Year: 2025).*
"Propeller Beta & Reverse Models" from X-Plane Developer (Sep. 2, 2015) (Year: 2015).*
Search Report issued in European Patent Application No. 24219237. 5; Date of Mailing Mar. 27, 2025 (11 pages).

* cited by examiner

*Primary Examiner* — Kito R Robinson
*Assistant Examiner* — Tanya C Sienko
(74) *Attorney, Agent, or Firm* — CANTOR COLBURN LLP

(57)      ABSTRACT

An engine and propeller control system (EPECS) of an aircraft includes a propeller with a plurality of blades coupled to an aircraft engine. Each of the blades are coupled to an actuator configured to adjust the blades between a first pitch to produce forward thrust and a second pitch to produce reverse thrust. The EPECS further includes a controller configured to control the actuator to invoke the second pitch in response to receiving a reverse thrust command signal. The controller is configured to alert that the reverse thrust command signal is generated prior to landing the aircraft.

17 Claims, 4 Drawing Sheets

Lienar Movement of Beta-Blade Converted from Rotational Propeller Blade Movement Rotational Movement of Propeller Blade Ground Sensor (WoW)

DISENGAGEMENT FOR REVERSE PROPELLER PROTECTION

BACKGROUND

This disclosure relates to structures for use in an aircraft, and more particularly, to a disengagement method for reverse propeller protection.

Aircraft engines can be designed with propeller blades capable of operating with a variable pitch, referred to as propeller blade angle or "beta". These variable pitch propellers can operate in a forward mode, a feather mode, a reverse mode, and a flight-idle mode. In the forward mode, the propeller blades are angled to provide forward thrust, propelling the aircraft in its intended direction. In the feathering mode, the blades are aligned parallel to the airflow, minimizing drag. In the reverse mode, often found in turboprop aircraft, the blades are pitched to produce thrust in the opposite direction, assisting in braking and backing up the aircraft, especially during ground operations. In the flight-idle mode, the propeller will adopt a relatively fine pitch (or low blade angle designed to produce minimal thrust while still allowing the engine to operate at a speed that can quickly respond to power adjustments.

For single-engine propeller airplanes, there may be a lock-out feature that prevents reverse propeller pitch while in flight. With this feature, if the aircraft operator brings the propeller mode lever into the reverse position while in flight, the engine and propeller control system (EPECS) may operate in the flight-idle mode. Then, after the EPECS has determined, via engine and/or aircraft inputs, that the aircraft is no longer in the air, the EPECS commands the propulsion system into the reverse propeller mode.

BRIEF DESCRIPTION

According to a non-limiting embodiment, an engine and propeller control system (EPECS) of an aircraft includes a propeller with a plurality of blades coupled to an aircraft engine. Each of the blades are coupled to an actuator configured to adjust the blades between a first pitch to produce forward thrust and a second pitch to produce reverse thrust. The EPECS further includes a controller configured to control the actuator to invoke the second pitch in response to receiving a reverse thrust command signal. The controller is configured to alert that the reverse thrust command signal is generated prior to landing the aircraft.

In addition to one or more of the features described above, or as an alternative to any of the foregoing embodiments, the controller delays invoking the second pitch for a set time period after receiving the reverse thrust command signal.

In addition to one or more of the features described above, or as an alternative to any of the foregoing embodiments, the controller refrains from adjusting the blades from the first pitch to the second pitch in response to cancelling the reverse thrust command signal.

In addition to one or more of the features described above, or as an alternative to any of the foregoing embodiments, the controller adjusts the blades from the first pitch to the second pitch in response to maintaining the reverse thrust command signal after the set time period expires.

In addition to one or more of the features described above, or as an alternative to any of the foregoing embodiments, a propeller mode selector in signal communication with the controller, the propeller mode selector configured to operate in a first position to generate the forward thrust command signal and a second position to generate the reverse thrust command signal.

In addition to one or more of the features described above, or as an alternative to any of the foregoing embodiments, the controller initiates an engine spool up of the engine while simultaneously generating an alert that the reverse mode will be automatically initiated after the set time period expires.

In addition to one or more of the features described above, or as an alternative to any of the foregoing embodiments, at least one sensor configured to detect weight on wheels of the aircraft, wherein the alert is generated based on detection of the weight on wheels.

In addition to one or more of the features described above, or as an alternative to any of the foregoing embodiments, the alert is generated in response to detecting the weight on wheels.

In addition to one or more of the features described above, or as an alternative to any of the foregoing embodiments, the alert is generated prior to detecting the weight on wheels.

According to another non-limiting embodiment, a method of controlling an adjustable propeller of an aircraft is provided. The method comprises coupling a plurality of blades to a propeller, where each blade including an actuator configured to adjust the blade between a first pitch to produce forward thrust and a second pitch to produce reverse thrust. The method further comprises outputting a reverse thrust command signal to invoke the second pitch of the blades, and generating an alert indicating that the reverse thrust command signal is output prior to landing the aircraft.

According to another non-limiting embodiment, a method of controlling an adjustable propeller of an aircraft is provided. The method comprises selecting a reverse propeller mode to transition an adjustable propeller from a forward thrust position to a reverse thrust position, and generating an alert indicating the reverse propeller mode is selected prior to landing of the aircraft. The method further comprises delaying transition into the reverse thrust position for a set time period, and transitioning the propeller from the forward thrust position to the second thrust position in response to the set time period expiring.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures describe below.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As described above, propeller gas turbine aircraft engines can include a control of the propeller pitch (blade angle, also referred as the "beta angle" or simply the "beta" of the propeller). In the event that the EPECS erroneously determines that the aircraft is no longer in the air while the reverse propeller is in the reverse position while in flight, the propeller may suddenly be moved into the reverse position without the aircraft operator expecting or desiring this situation causing an undesirable flight event.

The inventive teachings of the present disclosure address the short-comings by providing an EPECS configured to prevent initiation of a reverse propeller mode in response to detecting an erroneous on-ground state of an aircraft. According to a non-limiting embodiment, the EPECS invokes a delay between when the EPECS determines that the aircraft is no longer in the air and the propeller mode lever is in the reverse mode position. During this delay, the EPECS alerts the aircraft operator that reverse protection is about to be removed, thereby providing the aircraft operator a timing period at which to remove the reverse position request command (e.g., manipulate the propeller mode lever out of the reverse position and into either the idle or forward region) in order to remove the reverse propeller request command.

Figure 1:
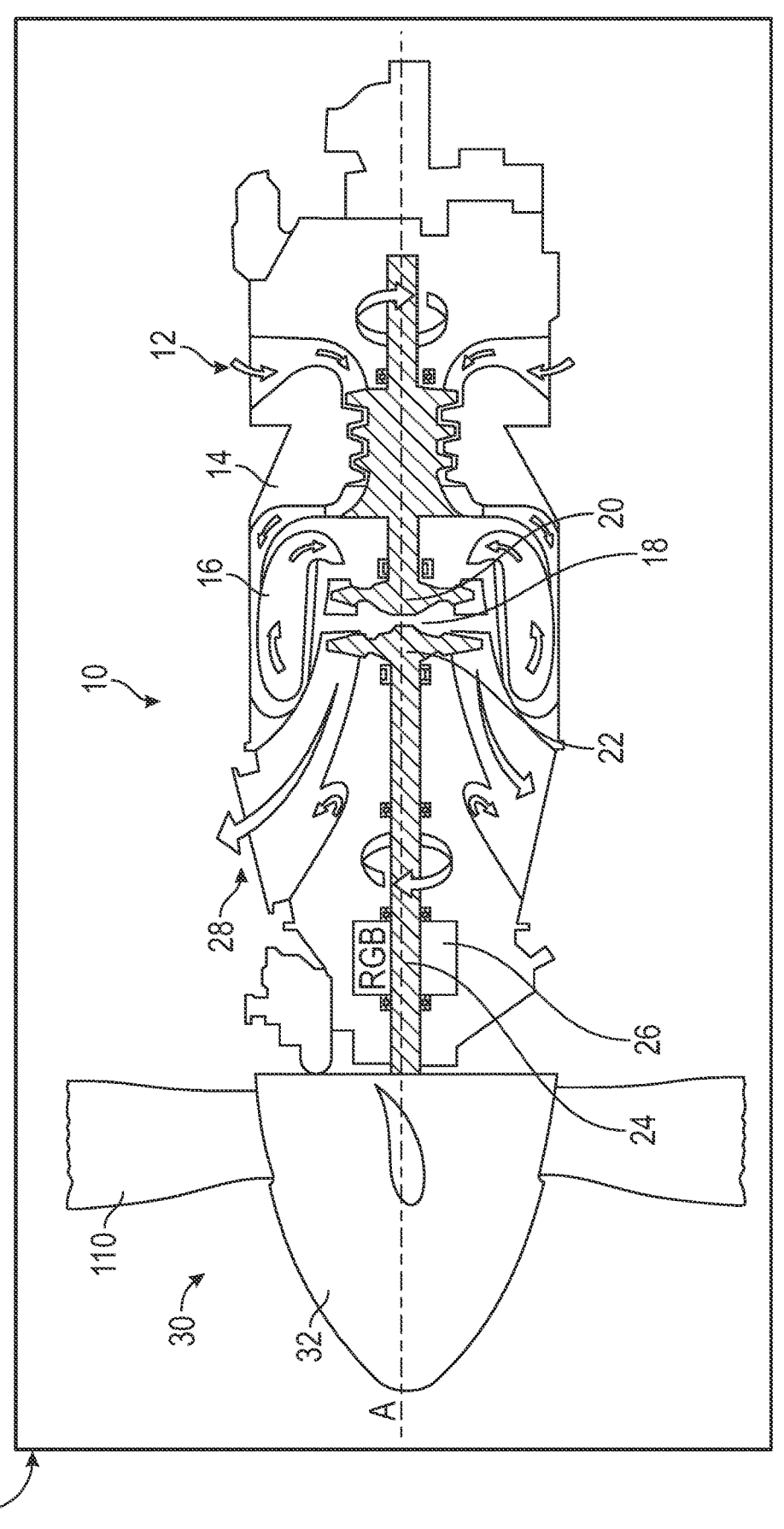
FIG. 1 is a schematic cross-sectional view of a gas turbine engine according to a non-limiting embodiment of the present disclosure.

With reference now to FIG. 1, a gas turbine engine 10 installed on an aircraft 5 is illustrated according to a non-limiting embodiment. The gas turbine engine includes an inlet 12, through which ambient air is directed, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 illustratively comprises a compressor turbine 20, which drives the compressor assembly and accessories, and at least one power or free turbine 22, which is independent from the compressor turbine 20 and rotatably drives a rotor shaft 24 about a longitudinal propeller shaft axis (A) through a reduction gear box 26. Hot gases may then be evacuated through exhaust stubs 28.

The engine 10 is coupled to a propeller 30. The propeller 30 includes a plurality of circumferentially-arranged blades 110 disposed on a hub 32 and which extend radially therefrom. Each of the blades 110 are rotatable about their own radial axes through a plurality of blade angles, which can be adjusted to achieve modes of operation, such as feather, full reverse, and forward thrust.

Figure 2:
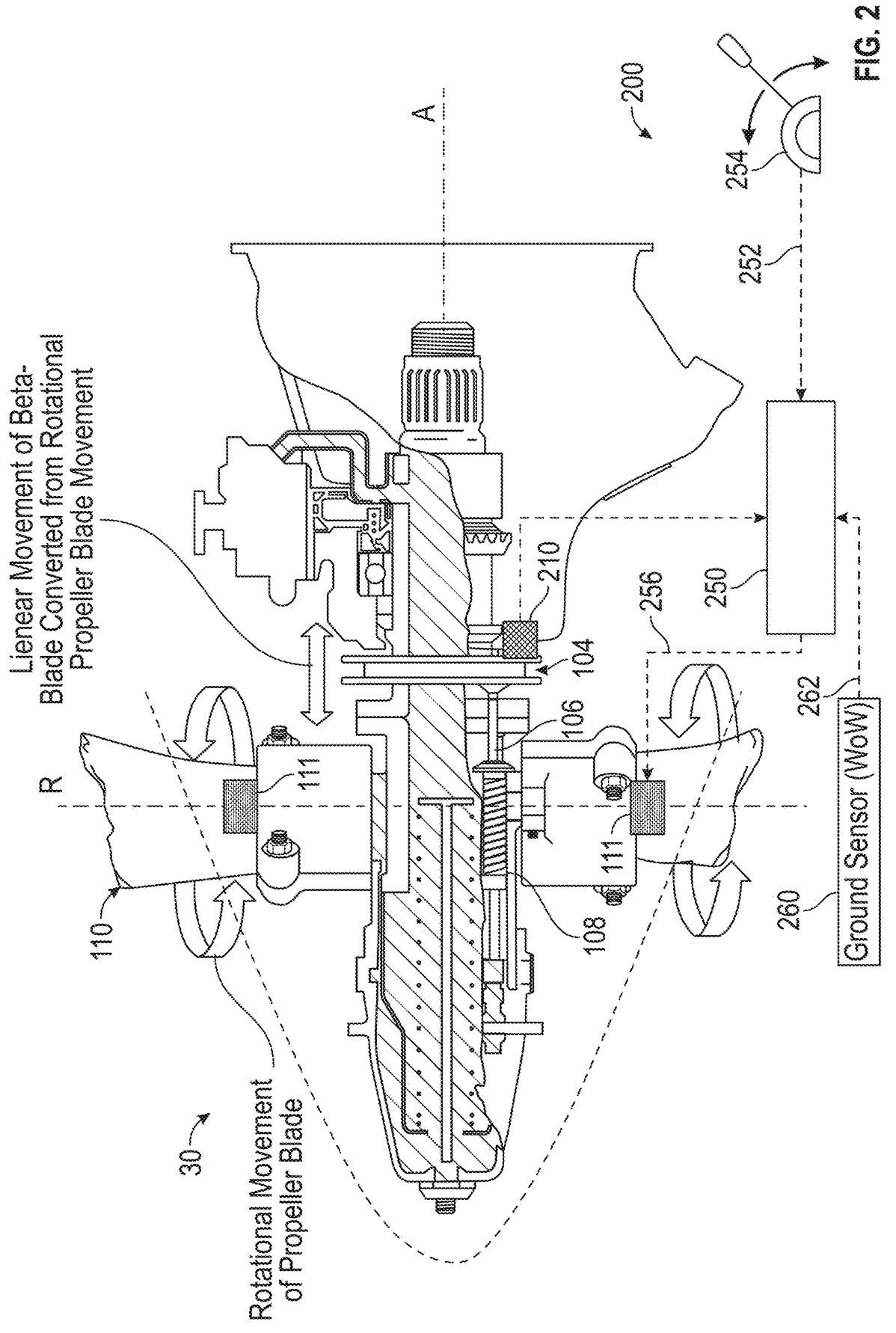
FIG. 2 is a schematic diagram of an engine and propeller control system (EPECS) configured to perform a disengagement method for reverse propeller protection according to a non-limiting embodiment of the present disclosure.

As depicted in FIG. 2, for example, each blade 110 is rotatable driven by an actuator 111 about a radially-extending axis (R) through a plurality of adjustable blade angles. The blade angles are defined herein as the angle between the chord line (i.e., a line drawn between the leading and trailing edges of the blade 110) of the propeller blade section and a plane perpendicular to the axis of propeller rotation. Accordingly, the propeller 30 may be implemented as a "reversable propeller" 30 having a plurality of modes of operation, such as feather, full reverse (sometimes referred to as reverse thrust), and full forward (sometimes referred to as forward thrust). The transition between forward mode and reverse mode is defined by the blade angle of attack (e.g., the angle between the chord line and the incoming airflow angle). In some modes of operations, such as feather mode, the blade angle is positive (e.g., positive angle of attack). In some modes, however, the propeller 30 may be operated in a "reverse mode", where the blade angle is negative (e.g., negative angle of attack).

The actuators 111 of each blade 110 are in signal communication with a controller 250. The controller 250 receives a propeller mode command signal 252, which commands the controller 250 to initiate one of the feather mode, full forward mode, or full reverse. Based on the propeller mode command signal 252, the controller 250 outputs an actuator control signal 256, which drives the actuator 111 to adjust the blade 110 into the position (e.g., forward or reverse) that achieves the requested propeller mode, e.g., feather mode, full forward mode, or reverse mode.

In one or more non-limiting embodiments, a propeller mode lever 254 is provided to provide the propeller mode command signal 252. For example, the propeller mode command signal 252 can be manipulated (e.g., moved or adjusted) into a first position to output a feather mode command signal requesting the feather mode, a second position to output a forward propeller command signal to request the forward propeller mode, a third position to output a reverse propeller command signal to request the reverse propeller mode, and a fourth position to output flight-idle command signal to request the flight-idle mode. Although a lever 254 is describes as one example, it should be appreciated that other means for selecting a given propeller mode can be employed such as push-buttons, touch-screen icons, etc., without departing from the scope of the present disclosure.

A beta-ring ring 104 is supported for rotation with the propeller 30, which rotates about the longitudinal axis (A). The beta-ring 104 is annular, for example, and may be referred to as a "feedback ring" or a "feedback beta-ring." The beta-ring 104 is also supported for longitudinal sliding movement along the longitudinal axis (A), e.g., by support members, such as a series of circumferentially spaced beta feedback rods 106 that extend along the longitudinal axis (A). A compression spring 108 surrounds an end portion of each rod 106. The beta-ring 104 is mounted in a manner that allows for it to be displaced along the longitudinal direction as the beta angle of the propeller blades 110 is adjusted. For example, adjustment of the beta angle causes a corresponding axial movement of the rods 106, and accordingly of the beta-ring 104, substantially parallel to axis (A). Conversely, adjustment of the beta angle in a first direction causes beta-ring 104 to move forwardly (e.g., towards the propeller 30), and adjustment of the beta angle in the opposite direction causes beta-ring 104 to move rearwardly (e.g., away from the propeller 30).

In an example, the rods 106 and beta-ring 104 are moved to a maximally-forward position when blades 110 are at their smallest (or most negative) beta angle, and are moved to a maximally-rearward position when blades 110 are at their largest (or most positive) beta angle. Accordingly, the beta-ring 104 may be used to provide blade angle (i.e., beta) position feedback from an axial position of the beta-ring 104 along the axis (A).

As depicted in FIG. 2, the propeller 30 can include a beta-sensor 210 in signal communication with a controller 250. The beta-sensor 210 is configured to measure the axial position of the beta-ring 104. The beta-sensor 210 is configured to detect and measure the movement of the beta-ring along the longitudinal axis (A) in response to rotation of the blades 110. In some embodiments, the beta-sensor 210 is a linear variable differential transformer (LVDT). In some embodiments, the beta-sensor 210 can be implemented as an optical sensor. In other embodiments, the beta-sensor 210 can be implemented as an eddy current proximity sensor.

The controller 250 receives signals an output from the beta-sensor 210. The signals include, for example, the measurement signal indicating the measured axial position of the beta-ring 104. The controller 250 may be referred to as a controller, which includes a processor and memory. In one or more non-limiting embodiments, the memory can store various look-up tables (LUTs), formulas and/or algorithms that convert measured linear movement of the beta-ring into a geometric blade angle. The memory can also store a method or algorithm, which when executed by the controller 250, accommodates for erroneous turboprop blade angle readings using minimum torque governing loop controlled by a Proportional, Integral, Derivative (PID) controller, for example, as described herein.

According to a non-limiting embodiment, the position of the beta-ring 104 may be determined based on known geometries of the engine and/or the various components described herein. For example, a position of the beta-sensor 210 relative to a propeller face datum position (e.g., a position defined by axis (R) in FIG. 2) may be used to provide a constant value (e.g., a distance between the propeller face datum position and the beta-sensor 210). In some embodiments, when there is a repeatable starting position of the beta-ring 104, relative movement may be used to determine the position of the beta-ring 104. A given axial position of the beta-ring corresponds to a given blade angle. Therefore, the blade angle can be determined from the axial position of the beta-ring 104 by the controller 250.

With continued reference to FIG. 2, an engine and propeller control system (EPECS) 200 for controlling the propeller 30 is illustrated according to a non-limiting embodiment of the present disclosure. The EPECS 200 includes a controller 250 in signal communication with the propeller mode lever 254 and a ground sensor 260. The controller 250 can determine whether the aircraft 5 is in flight (e.g., a flight state) or on the ground (e.g., an on-ground state) based on an input ground signal 262. In one or more non-limiting embodiments, the ground signal 262 (e.g. a WoW signal) is indicative of weight-on-wheels (WoW). The WOW signal 262 can be generated by one or more switches and/or sensors coupled to the aircraft landing gear, which determines an amount of resting on the aircraft wheels/landing gear. The controller 250 can compare the weight indicated by the WoW signal 262 to a weight threshold value. When the weight exceeds the weight threshold value, the controller 250 determines that the aircraft 5 is on the ground (i.e., an on-ground state) and no longer in flight (e.g., flying at an altitude above the ground). Although WoW is described as an example to determine whether the aircraft 5 is on the ground, signals indicating other parameters such as thrust, altitude, and/or aircraft speed, etc., can be utilized without departing from the scope of the invention.

As described herein, the EPECS 200 is configured to prevent the propeller 30 from transitioning into the reverse propeller mode in response to detecting an erroneous on-ground state of an aircraft. According to a non-limiting embodiment, the EPECS 200 invokes a delay (e.g., a 5 second delay) before outputting the actuator control signal 256 in response to receiving the reverse mode command signal (e.g., the propeller position lever 254 is in the reverse position) and determining the on-ground state based on the ground signal 262. The delay therefore provides a reverse mode protection since it provides the aircraft operator a time period to confirm the aircraft is in fact on the ground before the reverse propeller mode is initiated. During this delay, the EPECS 200 alerts the aircraft operator that the reverse mode protection is about to be removed, thereby providing the aircraft operator an opportunity to remove the reverse position request command 252 (e.g., manipulate the propeller mode lever 254 out of the reverse position and into either the idle or forward region) when the on-ground state is erroneously detected. In a non-limiting embodiment, the alert can be generated prior to detecting weight on wheels such that the pilot is advised during the approach segment that the propellor will reverse as soon as the set time period expires. In this manner, the alert can be generated before the final cross checks for landing and avoid unintended behavior due to an incorrect selection of the reverse propeller mode.

In one or more non-limiting embodiments, the EPECS 200 can also begin preparing the propeller 30 to operate in the reverse mode (e.g., initiate engine spool up) without fully invoking the reverse mode while simultaneously generating the alert that the reverse mode will be automatically initiated. In either case, the alert prevents an unintended initiation of the reverse propeller mode while the aircraft is still in flight can be avoided.

Figure 3:
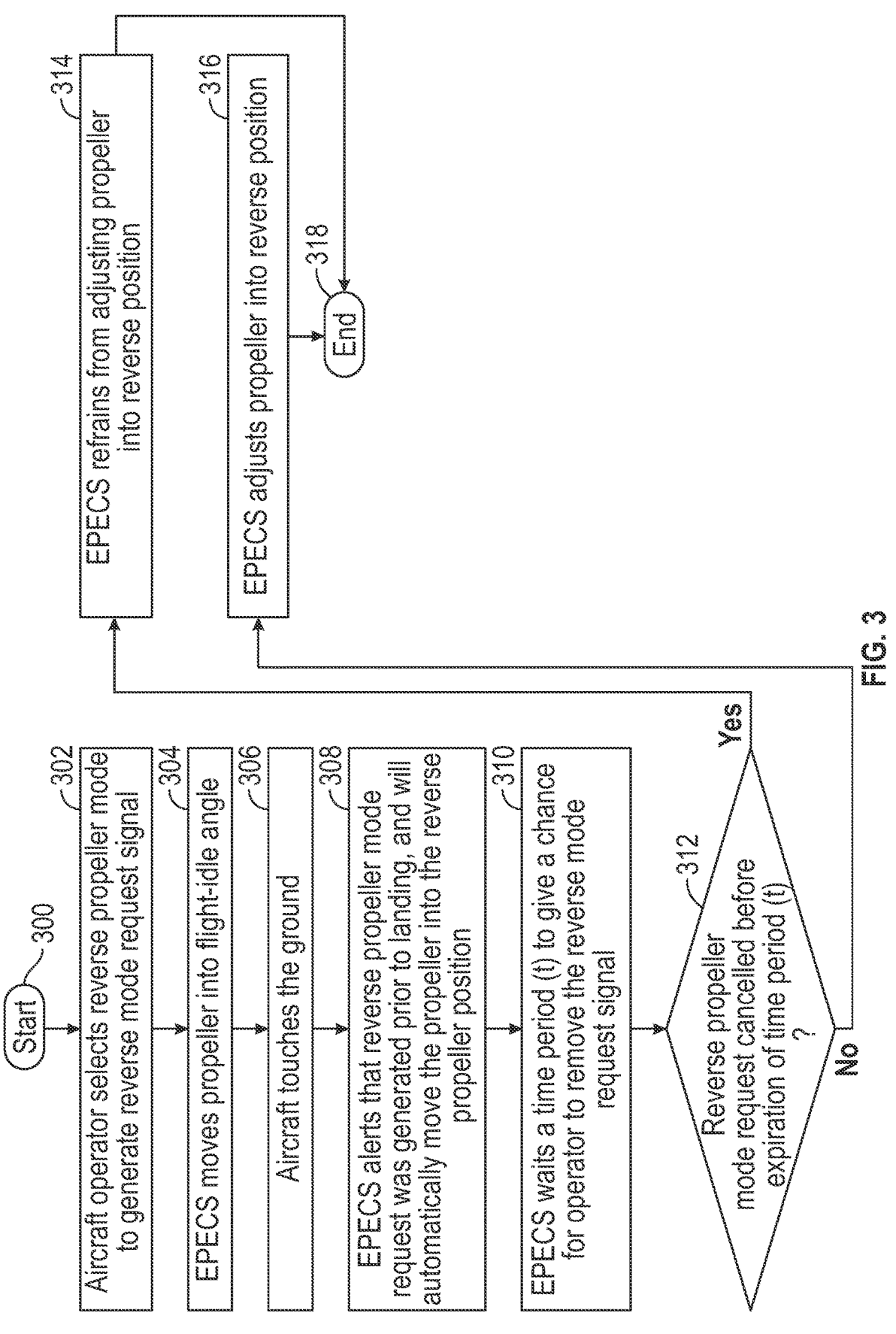
FIG. 3 is a flow diagram illustrating a method of initiating a reverse propeller mode while an aircraft is in flight according to a non-limiting embodiment of the present disclosure.

Turning now to FIG. 3, a method of initiating a reverse propeller mode while an aircraft is in flight according to a non-limiting embodiment of the present disclosure. The method begins at operation 300 and at operation 302 the aircraft operator selects the reverse propeller mode of the propeller. In one or more non-limiting embodiments, the aircraft operator can select the reverse propeller mode by adjusting a propeller position lever into a reverse mode position. At operation 304, the EPECS adjusts the blades of the propeller into a flight-idle angle position to invoke the flight-idle mode. In one or more non-limiting embodiments, the EPECS can generate an alert indicating that the reverse mode command signal has been generated (e.g., the propeller position lever is in the reverse position) and reverse mode is presently inhibited due to the aircraft being in flight (e.g., not currently on the ground). At operation 306, the aircraft touches ground and a ground signal (e.g., a WoW signal) is generated indicating detection of a ground-state of the aircraft.

At operation 308, the EPECS generates an alert indicating that the reverse propeller command signal (e.g., the propeller position lever was set to reverse position) was generated prior to landing, and will automatically move the propeller into the reverse propeller position. At operation 310, the EPECS waits a time period (t) to provide the aircraft operator an opportunity to cancel the reverse propeller command signal (e.g., to move the propeller position lever into forward propeller mode position). In a non-limiting embodiment, the time period (t) delays transitioning the propeller into the reverse mode to provide the aircraft operator to remove the reverse propeller mode request in case there was an erroneous detection of the ground-state. At operation 312, a determination is made as to whether the propeller mode request is cancelled before expiration of the time period (t). When the propeller mode request is cancelled before expiration of the time period (t), the EPECS refrains from adjusting propeller into reverse position at operation 314, and the method ends at operation 318. When, however, the propeller mode request is not cancelled before expiration of the time period (t), the EPECS adjusts the propeller into the reverse position at operation 316, and the method ends at operation 318.

Figure 4:
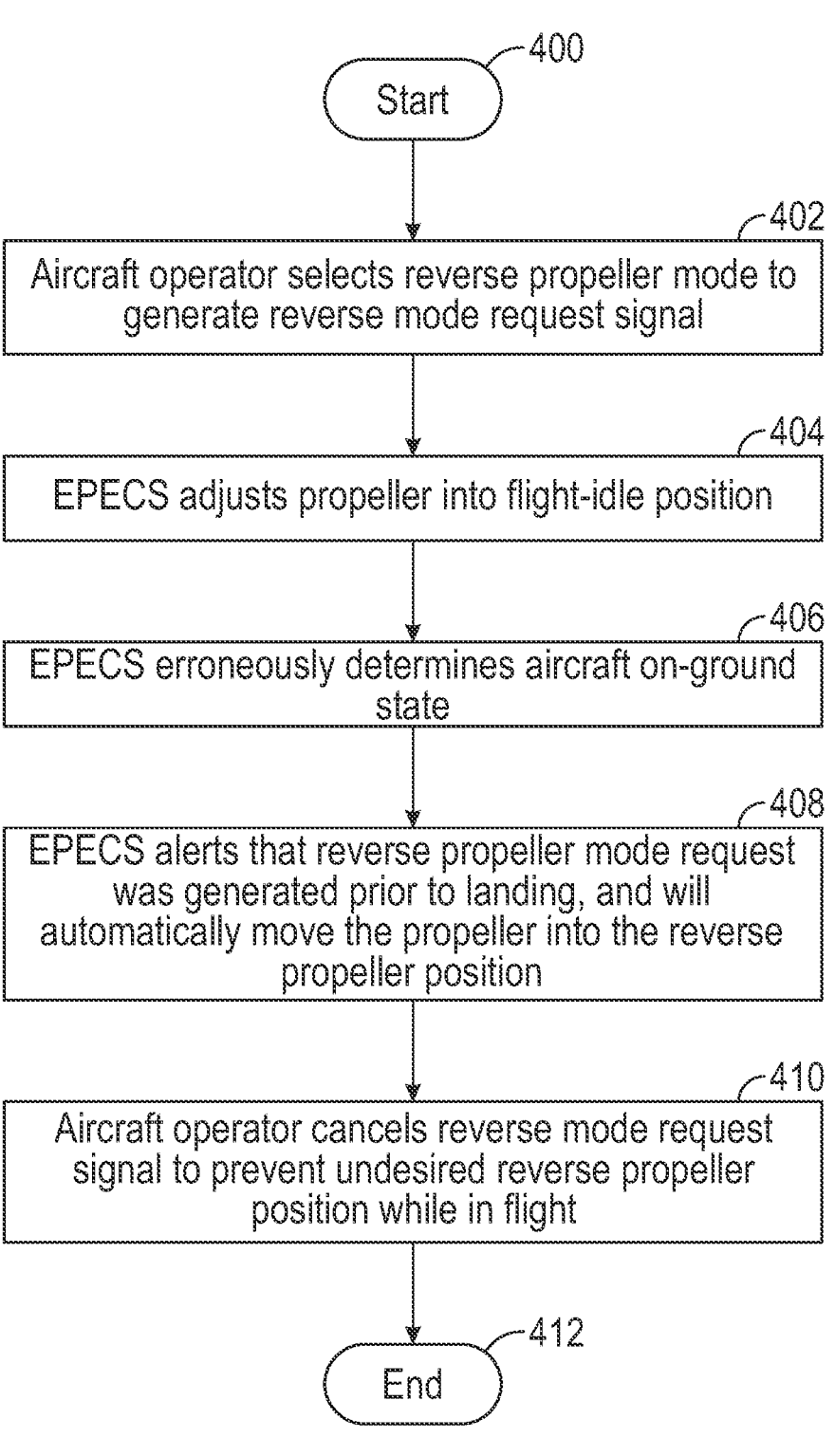
FIG. 4 is a flow diagram illustrating a method of preventing initiation of a reverse propeller mode in response to detecting an erroneous on-ground state of an aircraft according to a non-limiting embodiment of the present disclosure.

Referring to FIG. 4, a method of preventing initiation of a reverse propeller mode in response to detecting an erroneous on-ground state of an aircraft is illustrated according to a non-limiting embodiment of the present disclosure. The method begins at operation 400, and the aircraft operator selects the reverse propeller mode of the propeller at operation 402. In one or more non-limiting embodiments, the aircraft operator can select the reverse propeller mode by adjusting a propeller position lever into a reverse mode position. At operation 404, the EPECS adjusts the propeller into flight-idle position. At operation 406, the EPECS erroneously determines the on-ground state of the aircraft. At operation 408, the EPECS generates an alert indicating that the reverse propeller command signal (e.g., the propeller position lever was set to reverse position) was generated prior to landing, and will automatically move the propeller into the reverse propeller position. In at least one non-limiting embodiment, the EPECS determines the conditions that meet the criteria for automatically initiating the reverse mode are met and therefore the reverse mode will automatically be invoked following expiration of a time period (t). At operation 410, the aircraft operator cancels reverse mode request signal to prevent undesired reverse propeller position while in flight, and the ends at operation 412. Accordingly, the method provides an alert, which allows the aircraft operator to determine that the aircraft is in flight rather than on the ground and allows the operator to cancel the reverse mode request signal to prevent undesired reverse propeller position while in flight.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An engine and propeller control system (EPECS) of an aircraft, the EPECS comprising:
   a propeller coupled to an aircraft engine, the propeller including a plurality of blades, each of the blades coupled to an actuator configured to adjust the blades between a first pitch to produce forward thrust and a second pitch to produce reverse thrust;
   a controller configured to control the actuator to invoke the second pitch in response to receiving a reverse thrust command signal,
   wherein the controller is configured to alert that the reverse thrust command signal is generated prior to landing the aircraft, and wherein the controller initiates an engine spool up of the aircraft engine while simultaneously generating an alert that a reverse mode will be automatically initiated after a set time period expires.

2. The EPECS of claim 1, wherein the controller delays invoking the second pitch for a set time period after receiving the reverse thrust command signal.

3. The EPECS of claim 2, wherein the controller refrains from adjusting the blades from the first pitch to the second pitch in response to cancelling the reverse thrust command signal.

4. The EPECS of claim 3, wherein the controller adjusts the blades from the first pitch to the second pitch in response to maintaining the reverse thrust command signal after the set time period expires.

5. The EPECS of claim 2, wherein the set time period is about 5 seconds.

6. The EPECS of claim 1, further comprising a propeller mode selector in signal communication with the controller, the propeller mode selector configured to operate in a first position to generate a forward thrust command signal and a second position to generate the reverse thrust command signal.

7. The EPECS of claim 1, further comprising at least one sensor configured to detect weight on wheels of the aircraft, wherein the alert is generated based on detection of the weight on wheels.

8. The EPECS of claim 7, wherein the alert is generated in response to detecting the weight on wheels.

9. The EPECS of claim 1, wherein the alert is generated prior to detecting the weight on wheels.

10. A method of controlling an adjustable propeller of an aircraft, the method comprising:
    coupling a plurality of blades to a propeller, each blade including an actuator configured to adjust the blade between a first pitch to produce forward thrust and a second pitch to produce reverse thrust;
    outputting a reverse thrust command signal to invoke the second pitch of the blades;
    generating an alert indicating that the reverse thrust command signal is output prior to landing the aircraft,
    initiating an engine spool up of an aircraft engine while simultaneously generating a second alert that a reverse mode will be automatically initiated after a set time period expires.

11. The method of claim 10, further comprising delaying adjustment of the second pitch for a set time period after outputting the reverse thrust command signal.

12. The method of claim 11, further comprising refraining adjustment of the blades from the first pitch to the second pitch in response to cancelling the reverse thrust command signal.

13. The method of claim 12, further comprising adjusting the blades from the first pitch to the second pitch in response to maintaining the reverse thrust command signal after the set time period expires.

14. The method of claim 10, further comprising operating a propeller mode selector in a first position to generate a forward thrust command signal and a second position to generate the reverse thrust command signal.

15. A method of controlling an adjustable propeller of an aircraft, the method comprising:
    selecting a reverse propeller mode to transition an adjustable propeller from a forward thrust position to a reverse thrust position;
    generating an alert indicating the reverse propeller mode is selected prior to landing of the aircraft;

delaying transition into the reverse thrust position for a set
time period; and transitioning the propeller from the forward thrust posi-
tion to a second thrust position in response to the set
time period expiring, wherein transitioning the propeller from the forward
thrust position to the second thrust position comprises:

adjusting blades of the adjustable propeller into a flight-
idle angle in response to selecting the reverse propeller
mode; and automatically adjusting the blades from the flight-idle
angle to a reverse thrust angle in response to the set
time period expiring.

16. The method of claim 15, further comprising generat-
ing the alert prior to detecting weight on wheels of the
aircraft.

17. The method of claim 15, wherein the set time period
is about 5 seconds.

* * * * *